March 15, 1949.   M. COHEN ET AL   2,464,377
PI TYPE RESISTANCE CAPACITANCE FILTER UNIT
Filed June 20, 1946   2 Sheets-Sheet 1
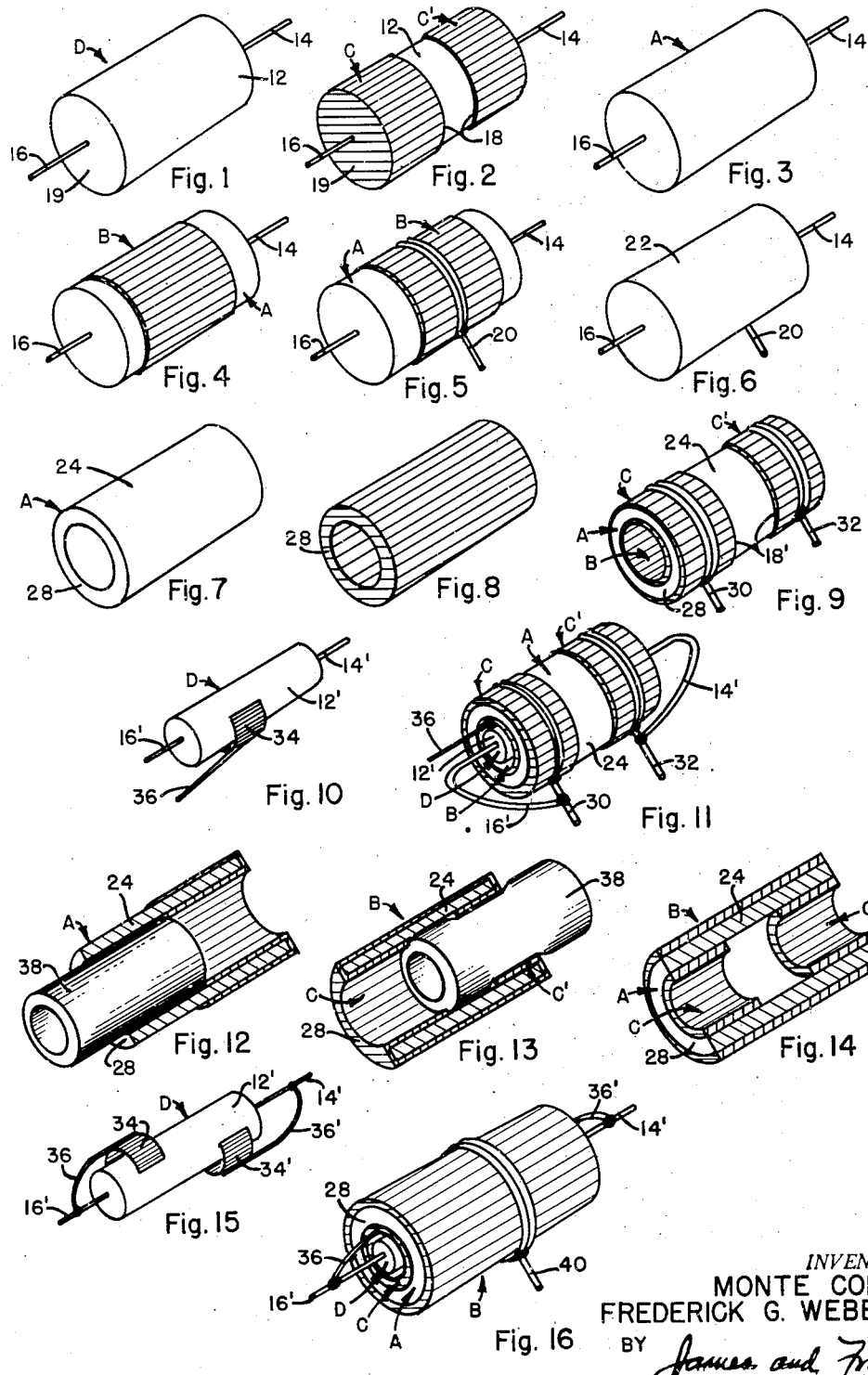
INVENTOR.
MONTE COHEN
FREDERICK G. WEBBER
BY James and Franklin
their attorneys March 15, 1949.    M. COHEN ET AL    2,464,377
PI TYPE RESISTANCE CAPACITANCE FILTER UNIT
Filed June 20, 1946    2 Sheets-Sheet 2

INVENTOR.
MONTE COHEN
FREDERICK G. WEBBER
BY James and Franklin
their attorneys

Patented Mar. 15, 1949

2,464,377

UNITED STATES PATENT OFFICE 2,464,377

PI TYPE RESISTANCE CAPACITANCE FILTER UNIT

Monte Cohen, Longmeadow, and Frederick G. Webber, Springfield, Mass., assignors to The F. W. Sickles Company, Chicopee, Mass., a corporation of Massachusetts Application June 20, 1946, Serial No. 677,961

10 Claims. (Cl. 178—44)

The present invention relates to a unitary electrical structure particularly adapted for use as an electrical filter unit in various electrical installations.

Matter disclosed but not claimed in this application is disclosed and claimed in applicants' copending application, Serial No. 15,998 of March 20, 1948, entitled "Electrical structure," which application is a continuation-in-part of this application.

Pi type resistance capacity networks are of common occurrence in electrical installations of all types and are of particular importance when of the form in which the two capacitors are connected in parallel across the line to form the legs of the pi and a resistor is connected in the line to form the top of the pi. Such a network arrangement is particularly useful as a low pass filter. When such filters are employed in radio circuits, the two capacitors are normally of equal capacitance values, these values ranging from 60 micromicrofarads up, and the resistor is ordinarily of the value of 50,000 ohms. These relationships and values are here stated as typical only and the present invention may be adapted to whatever values are dictated by the requirements of proper circuit design.

In the past, these networks have been formed by suitable electrical connection between standard resistor units, usually of the cylindrical type, and standard capacitor units, usually mica or ceramic dielectric condensers.

It is the prime object of the present invention to provide a single electrical unit which contains within itself the resistive and capacitive elements necessary for the formation of a network structure of the type described.

The advantages of such a structure are manifold. A present major trend in radio receiver design is toward smaller and smaller units such as may be carried in the owner's pocket. It is of extreme importance in such applications that the size of all circuit elements be reduced to their absolute minimum. Our invention comprises a combination of the resistor and capacitors which take up substantially no more space than the resistor itself. Consequently, by its employment in a radio receiver, the space, for example, taken up by two condensers is completely saved, and this with no loss of receiver performance.

Similar considerations are involved in the question of weight. Each standard capacitor has a substantial case, the weight of which, while not great in an absolute sense, is comparatively large. Fixed condensers of the wrapped foil type are of comparatively high weight. However, in the present invention, the resultant unitary structure is of substantially the same weight as that of the resistive unit incorporated therein and thus, for each of such units used, the weight of one or more standard capacitors is saved. This saving is so considerable as to be of importance not only in small portable receiving sets but also in more elaborate installations.

Equally, if not more important, than the above two considerations is the fact that the cost of the unitary structure of the present invention is far less than the combined costs of the standard resistive and capacitive units at present employed in the formation of networks of the type under discussion. In the present stage of the industry, a differentiation of a fraction of a cent per unit is of extreme industrial importance, and consequently the substantial differential in cost between the structure of the present invention and the combined units formerly employed looms large and would, even apart from the size and weight considerations detailed above, alone attest the importance of this invention.

The unitary structure of the present invention presents certain technical electrical advantages in addition to the economic and industrial advantages detailed above. Thus, the length of leads necessary to form the network is materially reduced, and in some embodiments of the invention is reduced to zero. This is of particular importance in high frequency applications where the inductive effect of long leads presents serious electrical limitations upon circuit design. In addition, in some embodiments of the present invention, the unit is self-shielded, this being of importance in audio frequency circuits and being of increasing importance as the frequency rises. In cases where the unit is self-shielded, the employment of conventional shield cans or plates is made unnecessary, with a consequent saving in size, weight, and expense over and above that already set forth.

To the accomplishment of the foregoing objects and advantages, the present invention resides in the unitary electrical structure as sought to be defined in the appended claims and as described in this specification, taken together with the accompanying drawings, in which:

Figs. 1 through 6 represent one embodiment of the present invention in various stages of construction;

Figs. 7 through 11 represent a second embodiment thereof;

Figs. 12 through 16 represent a third embodiment thereof;

Figure 28:
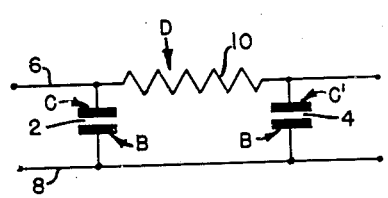
Fig. 28 is a circuit representation of a pi type network.

The present invention is here described as relating to a unitary electrical structure which, when it has been formed, defines, as shown in Fig. 28, a pi type resistance capacity network comprising a pair of capacitors 2 and 4 connected in parallel between two electrical lines 6 and 8. In line 6 and between the capacitors 2 and 4 is connected a resistance 10. In most applications it is contemplated the line 8 in which the resistance 10 is not connected will represent the common ground of the electrical apparatus in which the network is employed. It will be appreciated, however, that variations in the described structure can easily be made to conform to variations in the network. It is further obvious that variations in the electrical values of the resistor and capacitors embodied in our structure may be made to correspond to the desired electrical values dictated by circuit design.

The unitary structure of the present invention involves, as typically shown in Figs. 1 to 6, combining a dielectric layer A, a single capacitive plate B on one side thereof and a pair of separated capacitive plates C and C' on the other side thereof, and in then combining therewith a resistance element D in such a manner that the resistance becomes a physical part of the unitary structure adding no appreciable size to the pair of capacitors as defined by the three capacitive plates B, C and C', or, considered in another light, the capacitive elements B, C and C' add appreciably no weight or size to the resistance D. This invention is susceptible of many variations all of which attain the desired advantages of low weight, small size, and inexpensiveness, and each of which present additional advantages and disadvantages relative to one another. Some of these variations are illustrated and described herein, and they will be suggestive of many other variations without departing from the generic concept.

In the embodiment the construction of which is illustrated by Figs. 1 through 6, the structure has as its basic element a standard cylindrical electrical resistor 12 of desired ohmic value. This resistor has a pair of leads 14 and 16 (Fig. 1). A conductive coating is applied in any suitable manner to all of the outer surfaces of the resistor 12 except for a narrow band 18 at the center thereof, thus defining the two separated capacitive plates C and C', or the conductive coating may first be applied over all the outer surfaces and then removed from the portion of the resistor 12 defined by the band 18 (Fig. 2). It will be noted that, since the metallic coatings extend over the ends 19 of the resistor 12 and contact the leads 14 and 16, the two plates C and C' are thus electrically connected to the opposite ends of the resistor 12 without the necessity of any additional leads. This, as has already been pointed out, is particularly advantageous in high frequency applications.

To the structure of Fig. 2 is then applied a coating of insulating material, for example, glass, which coating not only insulates the plates C and C' and the conductive coatings on the ends of the resistor 12 but also serves as the dielectric layer A (Fig. 3). A conductive coating is then applied over the outer cylindrical surface of the structure only to form the single capacitive plate B (Fig. 4). Lead 20 is then attached to the capacitive plate B as by soldering (Fig. 5) and the entire assembly may then be recoated with a finish 22 of an insulating material if desired (Fig. 6).

It will be apparent from the above structure that connected directly between the leads 14 and 16 is the resistor 12 and connected to the resistor 12 at either end thereof is a capacitive plate C and C', between each of which and the single capacitive plate B the dielectric layer A sets up capacitive effects. Consequently, there are in effect two capacitors, one defined by plate B and plate C, and the other defined by plate B and plate C'. The plates C and C' are not in capacitive relation with one another. If lead 20 be connected to the line 8 of Fig. 28, the unitary structure will be electrically equivalent to the network of Fig. 28, the resistor 12 corresponding to the resistor 10, the capacitor B—C corresponding to the capacitor 2 and the capacitor B—C' corresponding to the capacitor 4.

A further advantage of the structure just described, aside from the fact that no leads are necessary between the resistor 12 and the capacitive plates C and C', is the fact that the entire structure is electrically enveloped by the capacitive plate B which may in turn be connected to ground. Consequently, the capacitive plate B will additionally serve as an electrical shield for the network.

The variation illustrated in Figs. 7 through 11 comprises a tube 24 formed, for example, of a ceramic material with high dielectric constant (Fig. 7) which is first coated inside and out with a conductive coating (Fig. 8). This coating is then removed from the ends 28 of the tube 24 and also from a band 18' at the center thereof (Fig. 9), thereby forming on the interior of the tube 24 a single capacitive plate B and on the exterior thereof a pair of separated capacitive plates C and C' both of which are separated from the single plate B by the dielectric tube 24. Leads 30 and 32 may be attached to the plates C and C' as by soldering (Fig. 9). The interior diameter of the tube 24 after coating is sufficient to admit therein a standard cylindrical resistor 12' of the desired ohmic value which has leads 14' and 16'. In order to make contact with the inner capacitive plate B, a spring contact tab 34 is so shaped as to fit over a portion of the resistor 12' but to be urged resiliently up therefrom, this effect being achieved by having a portion thereof normally assume a curved shape having a radius of curvature somewhat less than that of the exterior of the resistor 12'. This tab is connected to a lead 36 (Fig. 10). The resistor 12' with the clip 34 therearound is slid into the coated tube 24 and the leads 14' and 16' are connected, as by soldering, to the leads 30 and 32. The lead 36 projects out from between the resistor 12' and the inner capacitive plate B, with which it makes contact via spring tab 34 (Fig. 11). The entire unit may then be coated with insulation as in Fig. 6.

This structure has the advantage that the capacitive elements thereof may be independently constructed in a simple and inexpensive manner and may subsequently be incorporated with the resistor. However, it will be noted that the shielding effect and the minimum lead length achieved by the previously-described structure is not characteristic of this structure although the lead length is small compared with that involved in attainment of these networks by conventional methods.

The structure illustrated in Figs. 12 through 16 is basically similar to that of Figs. 7 through 11 except for the fact that the single capacitive plate B is formed on the exterior of the shell 24', thus achieving a built-in shielding effect at the expense of a somewhat more complicated manufacturing procedure and the employment of two instead of one spring clips 34. In this embodiment, the dielectric tube 24 is coated in two steps instead of one. A tube 38 of rubber or similar material is inserted into the interior of the tube 24 somewhat more than half-way and the remainder of the tube 24 is conductively coated (Fig. 12). The rubber tube 38 is then removed and inserted through the coated end of the ceramic tube 24 again more than half-way through the interior of the tube and the remainder of the tube is then coated. This results in a conductive coating extending over the ends 28 and the entire outer surface of the tube 24 and over separated portions of the inner surface thereof (Fig. 13). The tube 38 is removed and the conductive coating is eliminated from the ends 28 of the tube 24, the tube thus having a single capacitive plate B on the exterior thereof and a pair of separated capacitive plates C and C' on the interior thereof, the latter being separated from the single capacitive plate B by means of the dielectric tube 24. A standard cylindrical resistor 12' is again inserted into the coated interior of the tube 24 but since separate contact must be made with each of the capacitive plates C and C', a pair of spring tabs 34, 34' are employed, each having a lead 36, 36' which is electrically connected to the leads 14' and 16' of the resistor 12' (Fig. 15). After the resistor 12' and its attached spring tabs 34, 34' are inserted into the tube 24, a lead 40 is then attached to the single exterior capacitive plate B (Fig. 16) and the resultant structure may optionally be covered by an insulating material as in Fig. 6.

Figure 17:
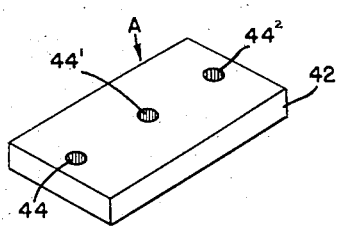
Figs. 17 through 21 represent a fourth embodiment thereof.
Figure 18:
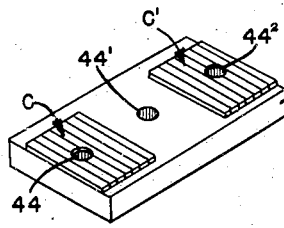
Figure 19:
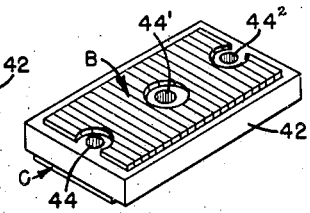
Figure 20:
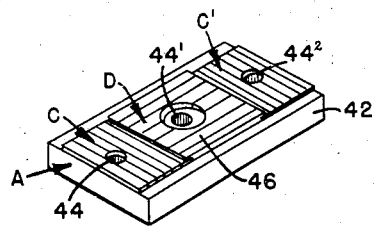
Figure 21:
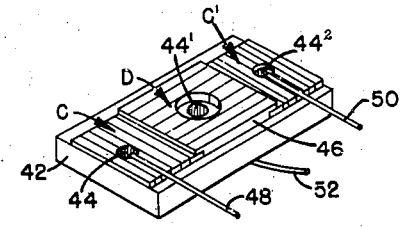
Figure 22:
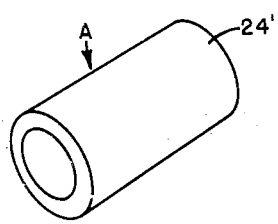
Figs. 22 through 25 and Fig. 27 represent a fifth embodiment thereof.

In the variation shown in Figs. 17 through 21 a flat plate 42 of dielectric material, e. g., mica or high dielectric ceramic, is employed as the base or support for the unitary structure of the present invention. This plate may be provided with a plurality of apertures 44, 44', 44² adapted to receive screws or rivets which will fasten the resultant structure to, for example, a radio chassis, and which will additionally facilitate the fastening of leads thereto. To one side of the plate 42 is applied a pair of separated conductive coatings defining capacitive plates C and C' each preferably partially forming apertures 44 and 44² respectively (Fig. 18) and on the other side of the plate 42 is formed a single conductive coating defining a capacitive plate B preferably separated from the apertures 44, 44', 44² (Fig. 19). Between the two separated plates C and C' is applied a coating 46 of resistive material such as colloidal graphite, this coating preferably extending to, and thus being closely electrically connected with, the plates C and C'. This coating 46 forms the resistance D, and is preferably separated from the aperture 44' (Fig. 20). Leads 48 and 50 may then be applied to the plates C and C' and lead 52 may be similarly applied to the single conductive coating B on the other side of the plate 42. The apertures 44, 44', 44² may optionally serve as lead fastening points, the fastening means through the central aperture 44' not making contact with the resistive coating D but aiding the attainment of contact between the single conductive coating B and the chassis, which constitutes the common or ground return line in most apparatus (Fig. 21). The resultant structure may optionally be covered by an insulating material as in Fig. 6.

Figure 23:
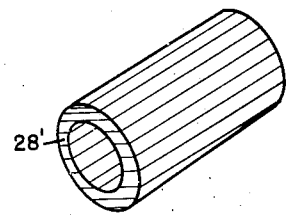
Figure 24:
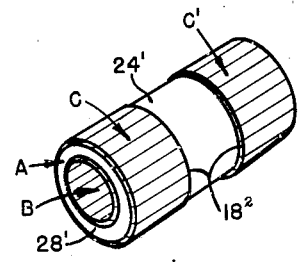
Figure 25:
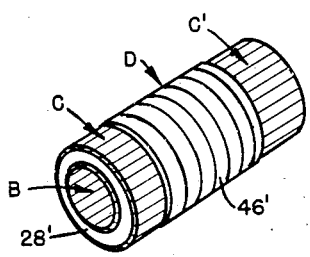
Figure 26:
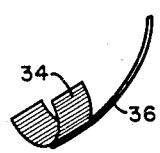
Fig. 26 shows the spring clip which is employed as a connective element in several of the embodiments.
Figure 27:
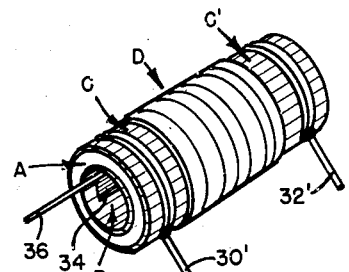

A similar unit but in cylindrical rather than flat form is shown in Figs. 22 through 25 and Fig. 27. Here, a hollow cylindrical tube 24' which constitutes the dielectric layer A (Fig. 22) is coated on its outer and inner cylindrical surfaces and on its ends 28' with a conductive coating (Fig. 23). This conductive coating is then removed as by grinding from the ends 28' and from the band 18² in the center thereof, thus forming on its interior a single capacitive plate B and on its exterior a pair of separated capacitive plates C and C' (Fig. 24). A layer 46' of resistive material such as colloidal graphite is then applied to the band 18², the edges thereof preferably making intimate physical and electrical contact with the plates C and C' (Fig. 25). Leads 30' and 32' are then attached to the separated capacitive plates C and C', and spring clip 34 with lead 36 attached thereto is inserted inside the hollow cylindrical shell 24' so as to make contact with the inner single conductive coating B (Fig. 27). The entire assembly may then be coated with an insulating finish as in Fig. 6.

The spring clip 34 as shown in Figs. 10 and 15 comprises a strip of resilient conductive material, such as phosphor bronze or beryllium copper, at least a portion of which assumes a normal arcuate shape of a curvature somewhat less than that of the interior surface of the cylindrical shell 24 with which it is used, and as shown in Fig. 27 it has a normal curvature somewhat greater than the interior of the cylindrical shell 24. The operation of the clip 34 of Figs. 10 and 15 has already been explained.

When the clip 34 of Fig. 27 is deformed to have a smaller radius of curvature and is inserted into the interior of the cylindrical shell 24, it will, when the deforming pressure is released, tend to resume its normal shape and in so doing will place itself against, and retain itself in pressed position on, the interior surface of the shell 24 and consequently will make electrical contact with whatever conductive coating B, C or C' it may be placed against. An electrical lead 36, which is secured to the tab 34 as, for example, by soldering, facilitates the making of electrical contact with the clip 34 and consequently with the conductive coating with which it is in contact. By this means, electrical connection with conductive coatings on the interior of the cylindrical shell 24 may be cheaply, quickly and conveniently made.

It will be apparent that, by the construction above described, there has been provided a simple unitary electrical structure of small size, low weight, and low manufacturing cost, which is adapted to be sold as a complete article of manufacture and to serve as a complete electrical network, here illustrated as a pi type resistance capacity filter network. Such a single unitary structure is adapted to replace the employment, for the illustrated network arrangement, of three separate circuit elements, to wit, a resistor and two capacitors. The articles of manufacture of the present invention may be tailor-made to fit any circuit requirements and, should the units become damaged or should the circuit requirements change, they may be replaced as a unit merely by soldering the leads to their proper circuit connections.

It is apparent that many variations may be made in the specific structures here disclosed without departing from the spirit of the invention as sought to be defined in the following claims. For example, the capacitive layers, instead of being coated onto a standard cylindrical resistor as in Figs. 1 through 6, could be formed of foil and paper in the manner of the conventional fixed capacitor and the resultant foil and paper can then be wrapped around the outer surface of the resistor. Many other variations will undoubtedly suggest themselves.

We claim:

1. A unitary electrical structure defining a pi type resistance capacitance filter network, said structure comprising a support of dielectric material defining the primary structural support for said unit, a single plate on one side thereof, a pair of separated plates on the other side thereof, said plates being of material which is a good conductor of electricity and defining a pair of capacitors in which the separated plates are not in effective capacitive relationship with each other, and a resistance element affixed on and supported by only said other side of said support between the pair of separated plates and a part of said unitary structure, the resistive ends of said resistance element making physical and electrical contact with said separated plates, the resistance thus being electrically interposed between the plates not in effective capacitive relation one to the other.

2. A unitary electrical structure defining a pi type resistance capacitance filter network, said structure comprising a hollow cylindrical shell of dielectric material, a plate on one side thereof, a pair of separated plates on the other side thereof, said plates being of material which is a good conductor of electricity and defining a pair of capacitors in which the separated plates are not in effective capacitive relationship with each other, and an annular band of resistive material secured to only said other side of said shell between said separated plates, the resistance being electrically connected to said separated plates so as to be electrically interposed between them.

3. The unitary electrical structure of claim 2, in which the resistive ends of said annular band of resistive material make physical contact with said separated plates.

4. The unitary electrical structure of claim 2, in which said pair of separated plates and said annular band of resistive material are on the exterior of said shell, and in which connection with the interior plate thereon is made by a connective means comprising a strip of resilient conductive material having a lead attached thereto and having a portion thereof bent to normally assume a circular shape of diameter greater than that of the interior of said shell, said connective means being inserted inside said shell so that the bent portion thereof resiliently engages said interior plate.

5. A unitary electrical structure defining a pi type resistance capacitance filter network, said structure comprising a flat sheet of dielectric material defining the primary structural support for said unit, a plate on one side thereof, a pair of separated plates on the other side thereof, said plates being of material which is a good conductor of electricity and defining a pair of capacitors in which the separated plates are not in effective capacitive relationship with each other, and a resistive layer affixed on and supported by only said other side of said sheet between said separated plates and electrically connected between said separated plates, the resistance thus being electrically interposed between the plates not in effective capacitive relation one to the other.

6. The unitary electrical structure of claim 5, in which the resistive ends of said resistive layer make physical contact with said separated plates.

7. A unitary electrical structure defining a pi type resistance capacitance filter network, said structure comprising a support of dielectric material, a single plate on one side thereof and covering substantially all of said side, a pair of separated plates on the other side thereof and covering substantially all of said side except for a gap between said plates, said plates being of material which is a good conductor of electricity and defining a pair of capacitors in which the separated plates are not in effective capacitive relationship with each other, and a resistive layer affixed on and supported by said other side of said support in the gap between said separated plates and electrically connected therebetween, the resistance thus being electrically interposed between the plates not in effective capacitive relation one to the other and the unitary structure having an area no greater than the area of said single plate.

8. The unitary electrical structure of claim 7, in which the resistive ends of said resistive layer make physical contact with said separated plates.

9. A unitary electrical structure defining a pi type resistance capacitance filter network, said structure comprising a flat sheet of dielectric material, a plate on one side thereof covering substantially all of said side, a pair of separated plates on the other side thereof covering substantially all of said side except for a gap between said plates, said plates being of material which is a good conductor of electricity and defining a pair of capacitors in which the separated plates are not in effective capacitive relation with each other, and a resistive layer affixed on and supported by said other side of said sheet in said gap between said separated plates, covering substantially all of said gap, and electrically connected between said separated plates, the resistance thus being electrically interposed between the plates not in effective capacitive relation one to the other and the unitary structure having an area no greater than that of said first named plate.

10. The unitary electrical structure of claim 9, in which the resistive ends of said resistive layer make physical contact with said separated plates.

MONTE COHEN.
FREDERICK G. WEBBER.

REFERENCES CITED

The following references are of record in the file of this patent:

UNITED STATES PATENTS

| Number | Name | Date |
|---|---|---|
| 2,016,303 | Sprague | Oct. 8, 1935 |
| 2,064,841 | Liebmann | Dec. 22, 1936 |
| 2,111,710 | Van Loon | Mar. 22, 1938 |
| 2,119,115 | Rohnfeld | May 31, 1938 |
| 2,126,915 | Norton | Aug. 16, 1938 |

FOREIGN PATENTS

| Number | Country | Date |
|---|---|---|
| 477,692 | Germany | June 12, 1929 |
| 314,167 | Great Britain | June 27, 1929 |
| 110,462 | Australia | Apr. 26, 1940 |